(12) United States Patent
MacLean

(10) Patent No.: US 7,161,341 B1
(45) Date of Patent: Jan. 9, 2007

(54) SYSTEM, CIRCUIT, AND METHOD FOR AUTO-ZEROING A BANDGAP AMPLIFIER

(75) Inventor: William MacLean, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 285 days.

(21) Appl. No.: 10/853,468

(22) Filed: May 25, 2004

(51) Int. Cl.
*G05F 3/16* (2006.01)
(52) U.S. Cl. .................................... 323/314
(58) Field of Classification Search ................ 323/313, 323/314, 315, 316, 317
See application file for complete search history.

(56) References Cited

U.S. PATENT DOCUMENTS

| | | | | |
|---|---|---|---|---|
| 4,375,595 A * | 3/1983 | Ulmer et al. | ............... | 327/378 |
| 4,857,823 A * | 8/1989 | Bitting | ........................ | 323/314 |
| 5,867,012 A * | 2/1999 | Tuthill | ........................ | 323/313 |
| 5,973,487 A * | 10/1999 | Henry | ........................ | 323/280 |
| 6,201,379 B1 * | 3/2001 | MacQuigg et al. | ......... | 323/313 |
| 7,009,373 B1 * | 3/2006 | Garavan | ..................... | 323/313 |

* cited by examiner

*Primary Examiner*—Jeffrey Sterrett

(57) ABSTRACT

A circuit includes a bandgap core coupled to an input voltage and capable of producing an output voltage. The circuit also includes an amplifier coupled to the bandgap core. In addition, the circuit includes a switch coupling the bandgap core to an output terminal. The switch is capable of being closed to provide the output voltage to the output terminal. The switch is also capable of being opened during auto-zeroing of the amplifier.

20 Claims, 3 Drawing Sheets

SYSTEM, CIRCUIT, AND METHOD FOR AUTO-ZEROING A BANDGAP AMPLIFIER

TECHNICAL FIELD

This disclosure is generally directed to bandgap circuits and more specifically to a system, circuit, and method for auto-zeroing a bandgap amplifier.

BACKGROUND

Bandgap circuits are used in many different types of applications. Bandgap circuits typically include a bandgap core and a bandgap amplifier. The bandgap amplifier is used to force the bandgap core to balance so that an output voltage produced by the bandgap circuit is stable and variations caused by temperature changes are small. Bandgap amplifiers, such as Complementary Metal Oxide Semiconductor (CMOS) amplifiers, typically suffer from offset. Offset in the amplifier may be corrected, but these corrections cause perturbations or other noise in the output voltage of the bandgap circuit. This noise may be particularly troublesome when the bandgap circuit is used to generate a reference voltage used by other components in a circuit.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
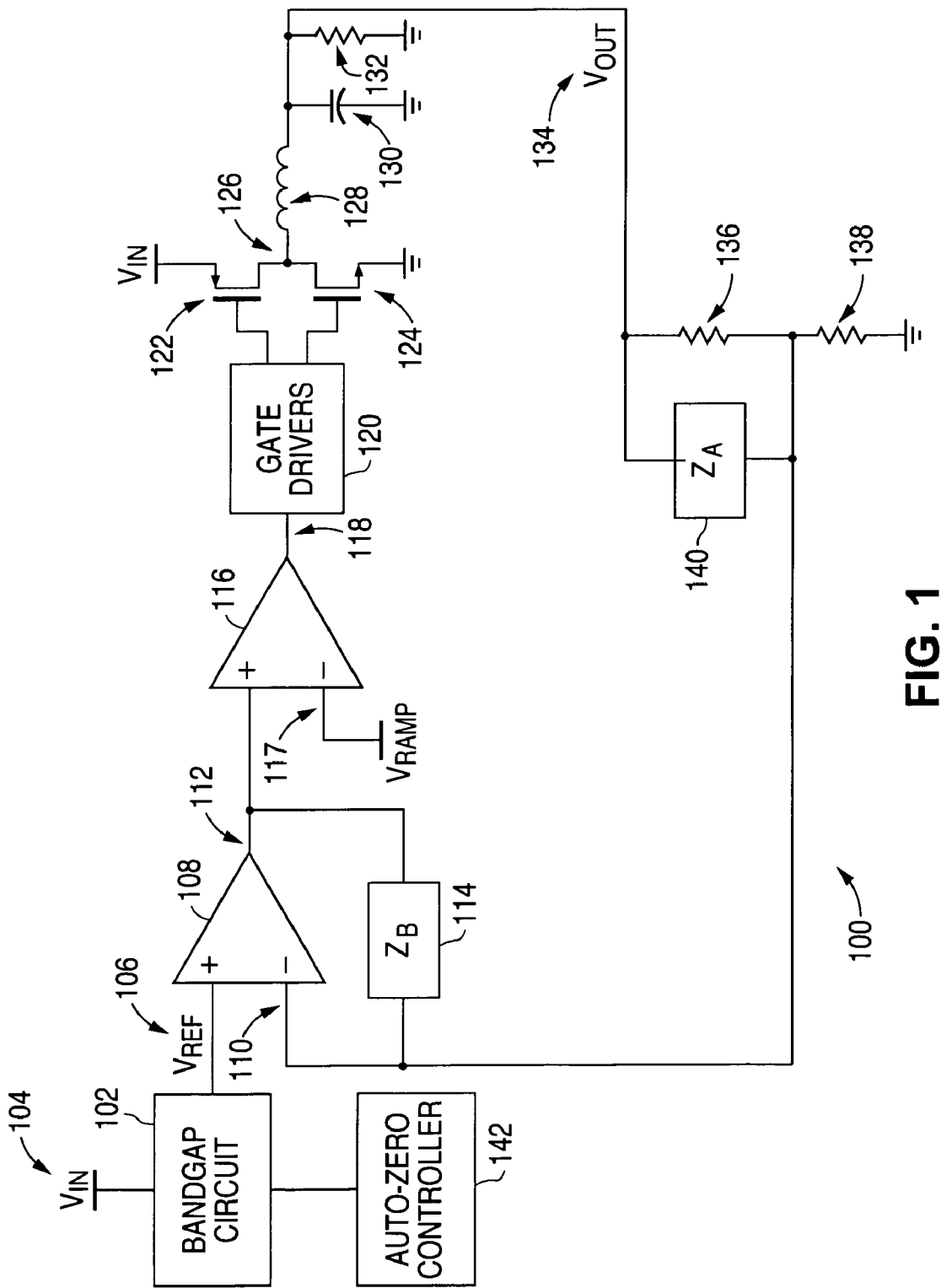
FIG. 1 is a block diagram illustrating an example switching regulator circuit according to one embodiment of this disclosure.

FIG. 1 is a block diagram illustrating an example switching regulator circuit 100 according to one embodiment of this disclosure. The switching regulator circuit 100 shown in FIG. 1 is for illustration only. Other embodiments of the switching regulator circuit may be used without departing from the scope of this disclosure.

Figure 2:
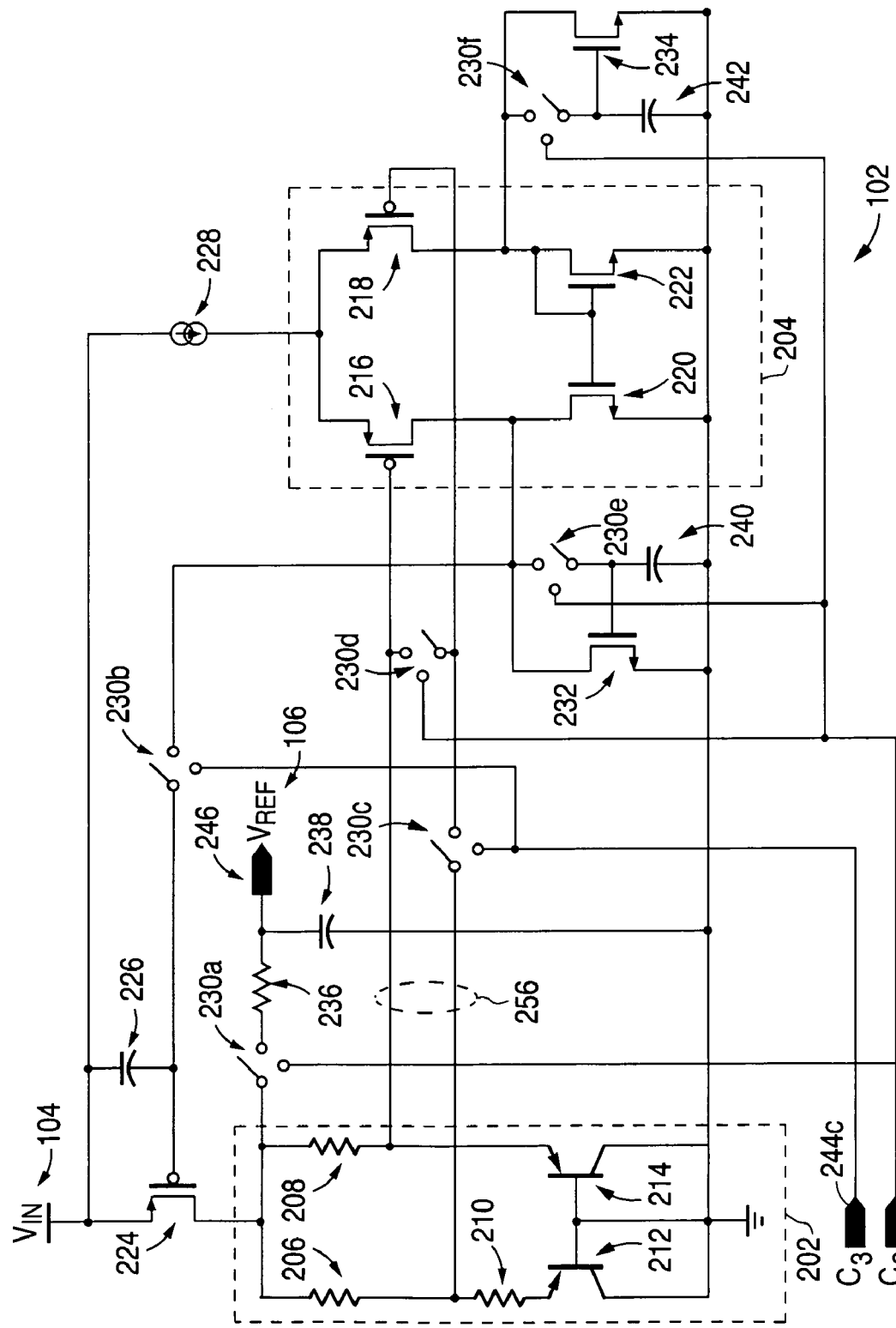
FIG. 2 is a block diagram illustrating an example bandgap circuit according to one embodiment of this disclosure.

In the illustrated example, the switching regulator circuit 100 includes a bandgap circuit 102. The bandgap circuit 102 is capable of receiving an input voltage ($V_{IN}$) 104 and generating a reference voltage ($V_{REF}$) 106. The bandgap circuit 102 includes any circuitry capable of generating a reference voltage 106 or other voltage from an input voltage 104. The bandgap circuit 102 may include, for example, a bandgap core and a bandgap amplifier. One embodiment of the bandgap circuit 102 is shown in FIG. 2, which is described below.

The bandgap circuit 102 is coupled to a comparator 108. In this document, the term "couple" and its derivatives refer to any direct or indirect communication between two or more components, whether or not those components are in physical contact with one another. The comparator 108 compares the reference voltage 106 produced by the bandgap circuit 102 with a second voltage 110. Based on the comparison, the comparator 108 generates an output voltage 112. For example, the comparator 108 may generate a high output voltage 112 when the reference voltage 106 is greater than the second voltage 110 and a low output voltage 112 when the reference voltage 106 is smaller than the second voltage 110. The second voltage 110 may, at least in part, be based on a prior output voltage 112 that is provided to an impedance 114. The impedance 114 may represent any suitable impedance.

The output voltage 112 from the comparator 108 is provided to a second comparator 116. The second comparator 116 compares the output voltage 112 to a ramp voltage ($V_{RAMP}$) 117. The second comparator 116 then generates a second output voltage 118 based on the comparison. For example, the second comparator 116 may generate a high second output voltage 118 when the output voltage 112 is greater than the ramp voltage 117 and a low second output voltage 118 when the output voltage 112 is smaller than the ramp voltage 117.

The output voltage 118 is provided to gate drivers 120. The gate drivers 120 are capable of supplying a control voltage to the gates of transistors 122–124. For example, depending on the output voltage 118, the gate drivers 120 could supply a high voltage to the gates of both transistors 122–124, a low voltage to the gates of both transistors 122–124, or a high voltage to one of the gates and a low voltage to another of the gates of the transistors 122 124.

A voltage at a connection point 126 between the transistors 122–124 is provided to an inductor 128, a capacitor 130, and a resistor 132. The inductor 128, capacitor 130, and resistor 132 may have any suitable inductance, capacitance, and resistance, respectively. The output of the inductor 128, capacitor 130, and resistor 132 represents an output voltage ($V_{OUT}$) 134.

The output voltage 134 is then supplied to a load. In this example, the load includes two resistors 136–138 and an impedance 140. The resistors 136–138 and the impedance 140 may have any suitable resistances and impedance, respectively. For example, the resistors 136–138 may have equal or approximately equal resistances. In particular embodiments, the load receiving the output voltage 134 may represent a high impedance load.

As described above, the bandgap circuit 102 includes a bandgap core and a bandgap amplifier. In one aspect of operation, the amplifier in the bandgap circuit 102 suffers from offset. For example, the amplifier in the bandgap circuit 102 may represent a Complementary Metal Oxide Semiconductor (CMOS) amplifier that suffers from offset. To compensate for this offset, the bandgap circuit 102 performs an "auto-zero" operation. The auto-zero operation typically involves measuring and then removing the offset voltage of the amplifier. The auto-zero operation in conventional bandgap amplifiers corrects the offset but causes perturbations or other noise in the reference voltage 106.

As described in more detail below, the bandgap circuit 102 includes one or more switches that are controlled to reduce or eliminate this noise. For example, the switches may be controlled so that the output of the bandgap circuit 102 (which provides the reference voltage 106) is disconnected from the bandgap core during auto-zeroing. Additional switches may be used to allow the auto-zeroing to occur. The output of the bandgap circuit 102 remains disconnected from the bandgap core during the auto-zeroing, and the output may be reconnected to the bandgap core after the auto-zeroing is complete. As a result, the reference voltage 106 may suffer from fewer or no perturbations or other noise caused by the auto-zeroing. In some embodiments, the auto-zeroing function is performed periodically or repeatedly.

In this example embodiment, the bandgap circuit 102 is coupled to an auto-zero controller 142. The auto-zero controller 142 is capable of controlling the auto-zeroing function of the bandgap circuit 102. For example, as described in more detail below, the auto-zero controller 142 may control the operation of the switches in the bandgap circuit 102 that are used to implement the auto-zeroing function. In particular embodiments, the auto-zero controller 142 is capable of controlling multiple groups of switches, and the auto-zero controller 142 opens and closes the groups of switches in a specified order to support the auto-zeroing function. The auto-zero controller 142 includes any hardware, software, firmware, or combination thereof for controlling one or more switches. In particular embodiments, the auto-zero controller 142 represents a sequencer capable of outputting a sequence of specific outputs to control the switches in the bandgap circuit 102.

Although FIG. 1 illustrates one example of a switching regulator circuit 100, various changes may be made to FIG. 1. For example, other or additional embodiments of the switching regulator circuit may be used. Also, the switching regulator circuit 100 shown in FIG. 1 represents one possible environment in which the bandgap circuit 102 and the auto-zero controller 142 may be used. The bandgap circuit 102 and the auto-zero controller 142 may be used in any other suitable circuit, device, or system.

FIG. 2 is a block diagram illustrating an example bandgap circuit 102 according to one embodiment of this disclosure. The bandgap circuit 102 shown in FIG. 2 is for illustration only. Other embodiments of the bandgap circuit 102 may be used without departing from the scope of this disclosure.

In this example, the bandgap circuit 102 includes a bandgap core 202 and a bandgap amplifier 204. The bandgap core 202 includes three resistors 206–210 and two transistors 212–214. The resistors 206–210 may have any suitable resistances. For example, the resistors 206–208 may each represent a 280 kg resistor, and the resistor 210 may represent a 27 kg resistor. Also, the transistors 212–214 may represent any suitable transistors, such as pnp-type transistors. This represents one of many possible embodiments of the bandgap core 202. Other embodiments of the bandgap core 202 could be used in the bandgap circuit 102.

The bandgap amplifier 204 includes four transistors 216–222. Two of the transistors 216–218 are capable of receiving two inputs 224 from the bandgap core 202. The transistors 216–222 may represent any suitable transistors, such as field effect transistors. This represents one of many possible embodiments of the bandgap amplifier 204. Other embodiments of the bandgap amplifier 204 could be used in the bandgap circuit 102.

Each of the bandgap core 202 and the bandgap amplifier 204 is coupled to a transistor 224, a capacitor 226, and/or a current source 228. The transistor 224 is coupled to the input voltage 104 and the resistors 206–208 in the bandgap core 202. The transistor 224 represents any suitable transistor, such as a field effect transistor. The capacitor 226 is coupled to the input voltage 104. The capacitor 226 is also coupled between the source and gate of the transistor 224. The capacitor 226 may have any suitable capacitance, such as 1 pF. The current source 228 is coupled to the input voltage 104 and the transistors 216–218 in the bandgap amplifier 204.

In addition, the bandgap circuit 102 includes six switches 230a–230f and two transistors 232–234. The switch 230a is coupled to a resistor 236, which is coupled to a capacitor 238. The transistors 232–234 are coupled to capacitors 240–242, respectively. The resistor 236 and the capacitors 238–242 may have any suitable resistance and capacitances, respectively. For example, the resistor 236 could represent a 100 kQ resistor, and the capacitors 238–242 could each represent a 10 pF capacitor. Also, the switches 230a–230f and the transistors 232–234 could represent any suitable switches and transistors, respectively. For example, the transistors 232–234 could represent field effect transistors.

The switches 230a–230f and transistors 232–234 are used to implement an auto-zero function in the bandgap circuit 102. The switches 230a–230f are also used to isolate the reference voltage 106 from perturbations and other noise produced by the bandgap circuit 102 during auto-zeroing. In this example, the switches 230a–230f are divided into three groups of switches, where the groups are associated with different input terminals 244a–244c. The input terminals 244a–244c receive input signals that control the opening and closing of the switches 230a–230f. The input signals may be supplied, for example, by the auto-zero controller 142.

In general, the switches 230a–230f allow the bandgap circuit 102 to operate in multiple modes. In a first or normal mode, the switches 230a–230c are closed, and the switches 230d–230f are open. In this mode, the bandgap circuit 102 operates normally and produces a reference voltage 106.

In a second mode, the switch 230a is opened. This disconnects the bandgap core 202 from an output terminal 246 (where the reference voltage 106 is provided). The reference voltage 106 is maintained at the output terminal 246 by voltage stored in the capacitor 238.

In a third state, the switches 230b–230c are opened, and the switches 230d–230f are closed. In this mode, the inputs 256 to the bandgap amplifier 204 are shorted or coupled to each other. Also, the two transistors 232–234 are configured to act as diodes. Any offset currents are provided to and stored in the capacitors 240–242 in this state. The voltages stored in the capacitors 240–242 help to remove the offset from the bandgap amplifier 204, which "auto-zeroes" the amplifier 204.

Once the bandgap amplifier 204 has completed auto-zeroing, the bandgap circuit 102 returns to the second state. That is, the switches 230b–230c are closed, and the switches 230d–230f are opened. When the switch 230b closes, the output produced by the bandgap core 202 may experience a perturbation. However, the switch 230a is still open at this point, so the perturbation does not propagate to the output terminal 246. Once the bandgap circuit 102 settles (such as after the perturbation caused by closing the switch 230b), the bandgap circuit 102 returns to the first state by closing the switch 230a. At this point, the bandgap circuit 102 begins operating normally again.

The auto-zeroing process described above may be repeated any number of times and at any suitable interval. Also, the bandgap circuit 102 may operate in each of the states for any suitable length of time.

Although FIG. 2 illustrates one example of a bandgap circuit 102, various changes may be made to FIG. 2. For example, the embodiment of the bandgap circuit 102 is for illustration only. Other embodiments, such as bandgap circuits with different bandgap cores or bandgap amplifiers, may be used.

Figure 3:
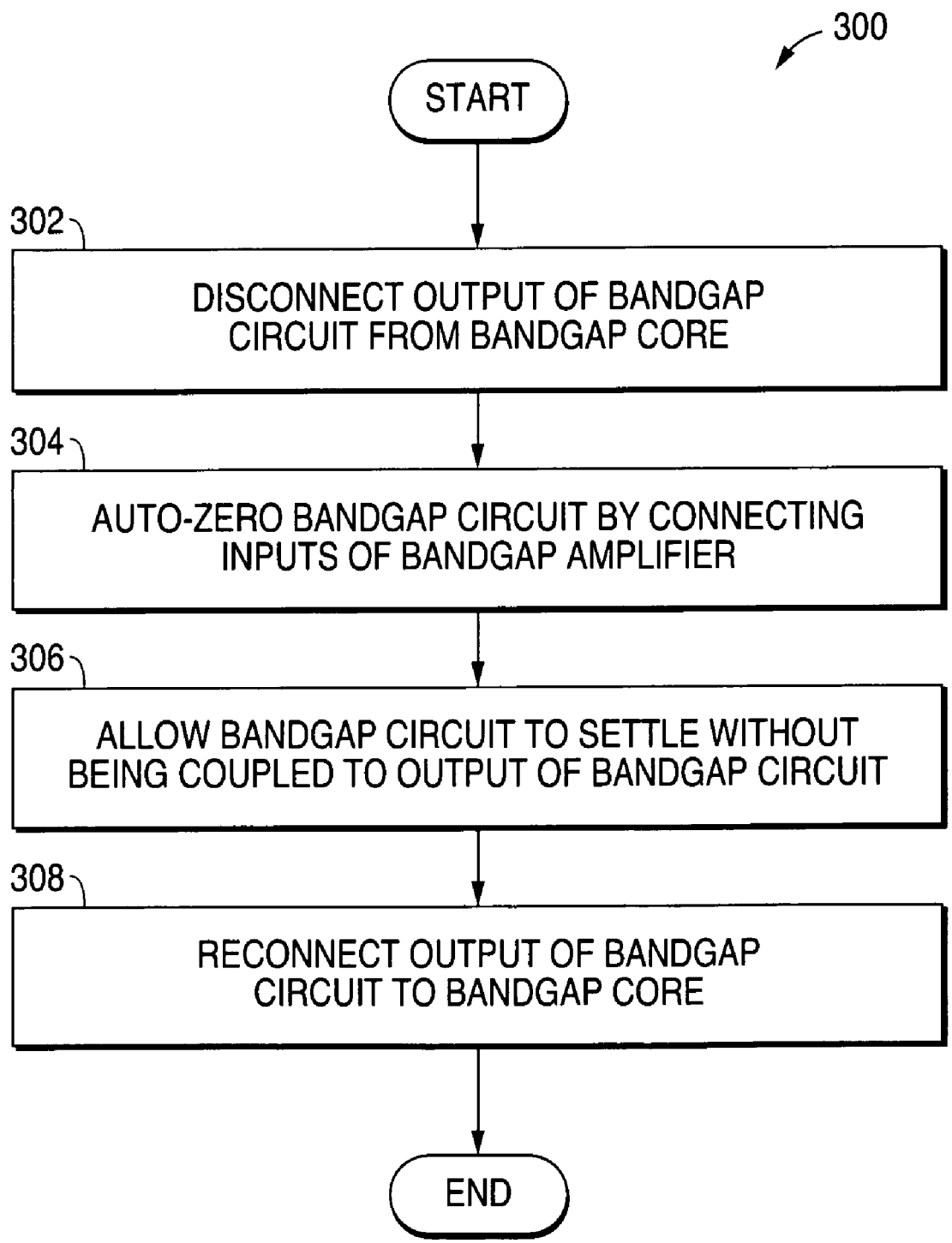
FIG. 3 is a flow diagram illustrating an example method for auto-zeroing a bandgap amplifier according to one embodiment of this disclosure.

FIG. 3 is a flow diagram illustrating an example method 300 for auto-zeroing a bandgap amplifier according to one embodiment of this disclosure. For ease of explanation, the method 300 is described with respect to the bandgap circuit 102 of FIG. 2. The method 300 could be used by any other circuit.

The output of a bandgap circuit 102 is disconnected from a bandgap core 202 in the bandgap circuit 102 at step 302.

This may include, for example, the auto-zero controller 142 generating output signals that cause the switch 230a in the bandgap circuit 102 to open. At this point, the voltage previously produced by the bandgap circuit 102 at the output terminal 246 is maintained by the voltage stored on the capacitor 238.

The bandgap circuit 102 is auto-zeroed at step 304. This may include, for example, the auto-zero controller 142 generating output signals that cause the switches 230b–230c to open and the switches 230d–230f to close. At this point, the inputs 256 to the bandgap amplifier 204 are coupled together, the transistors 232–234 are configured as diodes, and any offset current is stored in the capacitors 240–242.

The bandgap circuit 102 is allowed to settle at step 306. This may include, for example, the auto-zero controller 142 generating output signals that cause the switches 230b–230c to close and the switches 230d–230f to open. Closing switch 230b might otherwise cause a perturbation in the reference voltage 106 if the switch 230a was closed. However, because the switch 230a remains open, the perturbation does not propagate to the output terminal 246.

The output of the bandgap circuit 102 is reconnected to the bandgap core 202 at step 308. This may include, for example, the auto-zero controller 142 generating output signals that cause the switch 230a to close. At this point, the bandgap circuit 102 operates normally and produces the reference voltage 106 at the output terminal 246. While there may or may not be perturbations at the output terminal 246 caused by closing the switch 230a and by the natural discharge of the capacitor 238, the magnitude of any perturbations should be smaller than perturbations experienced by conventional bandgap circuits.

Although FIG. 3 illustrates one example of a method 300 for auto-zeroing a bandgap circuit 102, various changes may be made to FIG. 3. For example, various steps could be performed at the same time.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A circuit, comprising:
   a bandgap core coupled to an input voltage and producing an output voltage on an output terminal of said bandgap core;
   an amplifier coupled to the bandgap core; and
   a switch coupling the bandgap core to the output terminal of said bandgap core, the switch being closed to provide the output voltage to the output terminal of said bandgap core, the switch further being opened during auto-zeroing of the amplifier.

2. The circuit of claim 1, further comprising a capacitor coupled to the output terminal of said bandgap core, the capacitor at least temporarily maintaining the output voltage at the output terminal of said bandgap core when the switch is open.

3. The circuit of claim 1, further comprising a transistor coupling the bandgap core to the input voltage.

4. The circuit of claim 3, wherein the amplifier receives two inputs from the bandgap core;
   wherein the switch comprises a first switch; and
   further comprising:
   a second switch coupling one of the inputs from the bandgap core to the amplifier; and
   a third switch coupling a gate of the transistor to the amplifier.

5. The circuit of claim 4, further comprising:
   two second transistors coupled to the amplifier; and
   two capacitors, each capacitor coupled to a gate and a drain of one of the second transistors.

6. The circuit of claim 5, further comprising:
   a fourth switch and a fifth switch coupling gates of the second transistors to sources of the second transistors; and
   a sixth switch coupling the inputs from the bandgap core together.

7. The circuit of claim 6, wherein:
   the first switch is opened before auto-zeroing of the amplifier;
   the second and third switches are opened and the fourth, fifth, and sixth switches are closed to perform auto-zeroing of the amplifier;
   the second and third switches are closed and the fourth, fifth, and sixth switches are opened after auto-zeroing of the amplifier; and
   the first switch is closed after the second and third switches are closed and the fourth, fifth, and sixth switches are opened.

8. The circuit of claim 1, wherein:
   the bandgap core comprises:
   a first transistor and a second transistor;
   a first resistor and a second resistor coupled in series with the first transistor; and
   a third resistor coupled in series with the second transistor; and
   the amplifier comprises:
   a third transistor and a fourth transistor coupled in series; and
   a fifth transistor and a sixth transistor coupled in series, the fifth and sixth transistors coupled in parallel with the third and fourth transistors.

9. A system, comprising:
   a bandgap circuit comprising:
   a bandgap core coupled to an input voltage and producing an output voltage on an output terminal of said bandgap core;
   an amplifier coupled to the bandgap core; and a switch coupling the bandgap core to the output terminal of said bandgap core, the switch being closed to provide the output voltage to the output terminal of said bandgap core, the switch further being opened during auto-zeroing of the amplifier; and a controller that controls the switch.

10. The system of claim 9, wherein the bandgap circuit further comprises a capacitor coupled to the output terminal of said bandgap core, the capacitor at least temporarily maintaining the output voltage at the output terminal of said bandgap core when the switch is open.

11. The system of claim 9, wherein the bandgap circuit further comprises a transistor coupling the bandgap core to the input voltage.

12. The system of claim 11, wherein:
the amplifier receives two inputs from the bandgap core;
the switch comprises a first switch; and
the bandgap circuit further comprises:
   a second switch coupling one of the inputs from the bandgap core to the amplifier; and
   a third switch coupling a gate of the transistor to the amplifier.

13. The system of claim 12, wherein the bandgap circuit further comprises:
two second transistors coupled to the amplifier; and
two capacitors, each capacitor coupled to a gate and a drain of one of the second transistors.

14. The system of claim 13, wherein the bandgap circuit further comprises:
a fourth switch and a fifth switch coupling gates of the second transistors to sources of the second transistors; and
a sixth switch coupling the inputs from the bandgap core together.

15. The system of claim 14, wherein the controller:
opens the first switch before auto-zeroing of the amplifier;
opens the second and third switches and closing the fourth, fifth, and sixth switches to perform auto-zeroing of the amplifier;
closes the second and third switches and opening the fourth, fifth, and sixth switches after auto-zeroing of the amplifier; and
closes the first switch after the second and third switches are closed and the fourth, fifth, and sixth switches are opened.

16. The system of claim 9, further comprising a load coupled to the bandgap circuit.

17. The system of claim 16, wherein the load receives and uses the output voltage as a reference voltage.

18. A method, comprising:
opening a switch coupled between a bandgap core of a bandgap circuit and an output terminal of said bandgap core;
auto-zeroing an amplifier in the bandgap circuit;
allowing the bandgap circuit to settle; and
closing the switch coupled between the bandgap core and the output terminal of said bandgap core.

19. The method of claim 18, wherein:
the switch comprises a first switch; and
auto-zeroing the amplifier comprises:
   opening a second switch and a third switch, the second switch coupled between one of two inputs from the bandgap core and the amplifier, the third switch coupled between a transistor and the amplifier, the transistor coupled to an input voltage; and
   closing a fourth switch, a fifth switch, and a sixth switch, the fourth switch and the fifth switch coupled between sources and gates of two second transistors, the second transistors coupled to the amplifier, the sixth switch coupled between the two inputs from the bandgap core.

20. The method of claim 19, wherein allowing the bandgap circuit to settle comprises:
closing the second and third switches; and
opening the four, fifth, and sixth switches.

* * * * *

UNITED STATES PATENT AND TRADEMARK OFFICE
CERTIFICATE OF CORRECTION

| | |
|---|---|
| PATENT NO. | : 7,161,341 B1 |
| APPLICATION NO. | : 10/853468 |
| DATED | : January 9, 2007 |
| INVENTOR(S) | : William MacLean |

It is certified that error appears in the above-identified patent and that said Letters Patent is hereby corrected as shown below:

Column 3, line 37, delete "280 kg" and replace with --280kΩ--;

Column 3, line 38, delete "27 kg" and replace with --27kΩ--;

Column 8, claim 20, line 38, delete "four" and replace with --fourth--.

Signed and Sealed this

Fifth Day of June, 2007

JON W. DUDAS
*Director of the United States Patent and Trademark Office*